Aug. 31, 1926.
W. W. ARMSTRONG
AUTOMOBILE JACK
Filed April 21, 1925
1,598,413
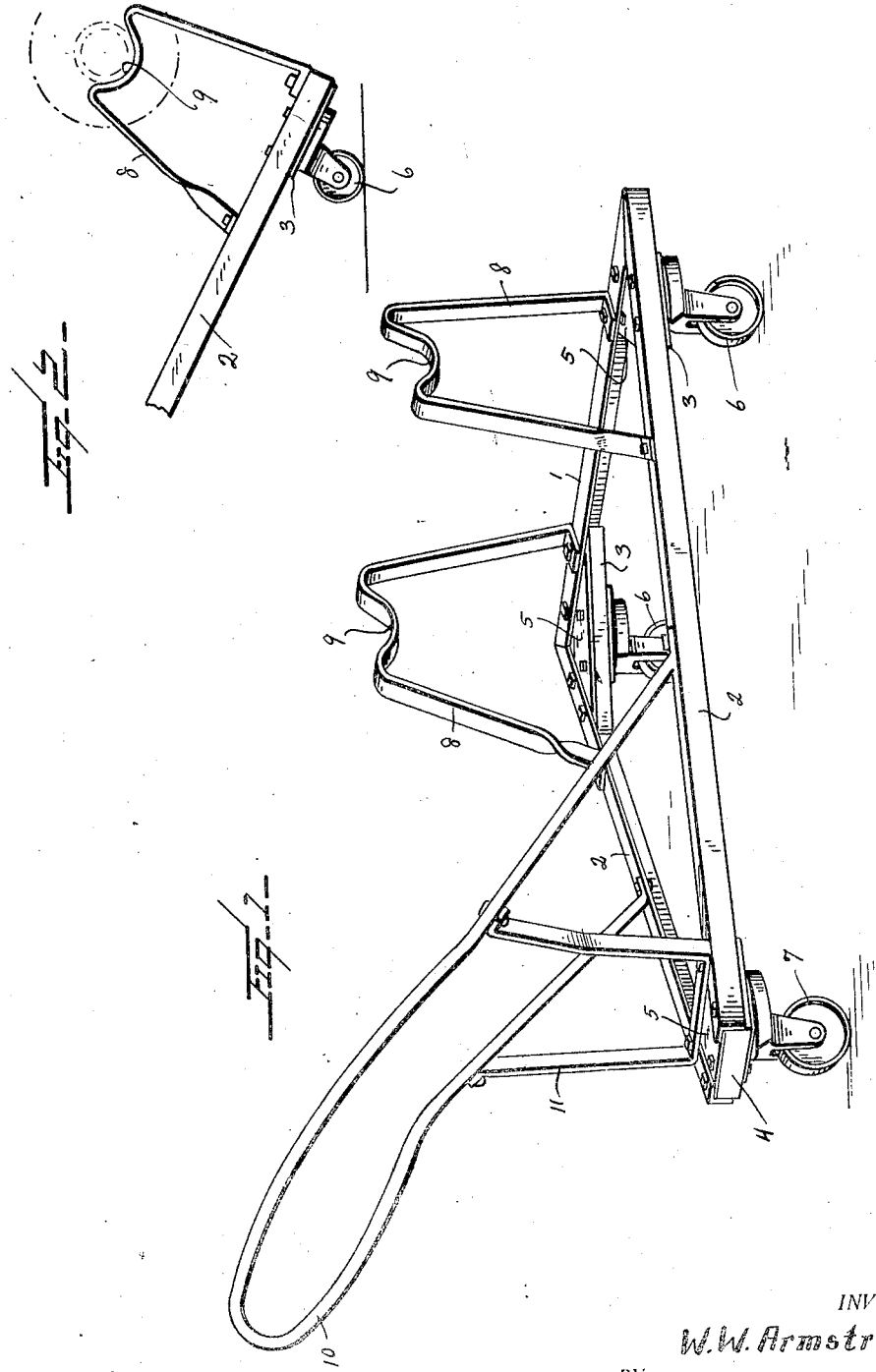
INVENTOR.
W.W. Armstrong
BY Watson E. Coleman
ATTORNEY.

Patented Aug. 31, 1926.

1,598,413

UNITED STATES PATENT OFFICE.

WALTER W. ARMSTRONG, OF KEITHSBURG, ILLINOIS, ASSIGNOR TO TOM HANEY, OF KEITHSBURG, ILLINOIS.

AUTOMOBILE JACK.

Application filed April 21, 1925. Serial No. 24,824.

This invention relates to an improved jack for use in connection with an automobile and one object of the invention is to provide a jack which may be used in garages and other places where automobiles are repaired and which is so constructed that by means of this device the rear end of an automobile may be easily lifted from the ground and the wheels of the automobile held out of engagement with the ground so that the tires may be inflated or the wheels removed so as to permit necessary repairs to be made.

Another object of the invention is to so construct this jack that when in use it will provide a firm support for the rear end portion of the automobile and not only permit the rear end to be held in an elevated position, but also permit the rear end portion of the automobile to be moved very easily in any direction desired.

Another object of the invention is to so construct this jack that it may be very easily placed in engagement with the rear axle casing upon opposite sides of the differential housing and then moved into an operative position and during movement to the operative position cause the rear end of the automobile to be moved to the elevated position.

This invention is illustrated in the accompanying drawings, wherein:—

Figure 1 is a perspective view of the improved jack.

Figure 2 is a fragmentary view showing the jack tilted to a position for engaging the rear axle casing of an automobile.

This improved jack is in the form of a low carriage or truck which is provided with floor engaging castors and arms for engagement with the rear axle casing and is further provided with a handle so that the jack may be tilted and placed under the rear axle casing and the handle then swung downwardly to lower the rear end of the truck and move the forward end portion beneath the axle and cause the arms to lift the axle and move the wheels off of the floor of the garage. It will therefore be seen that when this jack is in use it may be very easily moved to an automobile lifting position and when the tires have been inflated or the necessary repair work done the handle may then be swung upwardly to tilt the truck and permit the wheels of the automobile to again move into engagement with the floor of the garage.

The truck is triangular in shape and is provided with a forward bar 1 and side bars 2 which extend rearwardly from the ends of the forward bar 1. These bars 1 and 2 are formed of angle iron and at their meeting ends are connected with corner blocks 3 which are triangular in shape and may be formed of wood, metal or any other desired material. The bars 1 and 2 are secured to these corner blocks 3 by bolts or other suitable fasteners so that they will be very firmly held to the corner blocks. At their rear ends the side bars 2 terminate in spaced relation and are secured to a block 44 which may also be formed of wood or any other desired material. As previously stated the blocks 3 and 4 will be preferably formed of wood and in order to strengthen these blocks there has been provided plates 5. Castors 6 and 7 are secured to the under faces of the blocks 3 and 4 and are of a conventional construction which permits them to turn freely so that the rear end portion of the automobile may be easily moved about when held in an elevated position by this jack.

In order to engage the rear axle casing upon opposite sides of the differential housing the truck has been provided with yokes 8 which are substantially U-shaped and have the lower end portions of their arms secured to the cross bar 1 and side bars 2 and have their bridge portions bent to provide axle receiving seats 9. The handle 10 for this jack is also U-shaped and has its arms extending forwardly and secured to the side bars 2 intermediate the length of the jack. This handle extends rearwardly of the jack beyond the rear end thereof and at an upward incline so that the handle may be easily grasped to tilt the jack when putting it in engagement with the rear axle casing and for swinging the rear end portion of the jack downwardly to receive the automobile. A brace 11 is secured to the rear end portions of the side bars 2 adjacent the forward edge of the block 4 and has upwardly extending arms secured to the arms of the handle. It will therefore be seen that this handle will be firmly braced against downward movement when pressure is applied to force the jack into an operative position beneath the automobile.

When this device is in use the handle will be grasped and the rear end portion of the truck lifted. The jack is then moved forwardly upon the front rollers 6 so that the yokes 8 extend beneath the axle upon opposite sides of the transmission housing. The seats 9 will be brought into engagement with the axle casing and the rear end portion of the truck can then be forced downwardly by placing a foot upon the corner block 4 and pressing downwardly and forwardly. This will cause the rear end portion of the truck to be moved downwardly to bring the castor 7 into engagement with the floor and at the same time the truck will be moved forwardly so that the forward end portion of the truck extends beneath the rear axle casing. The yokes 8 are of such a height that the distance between the floor and the axle casing receiving seats 9 is greater than the distance between the floor and the axle casing when the wheels of the automobile are resting upon the floor and, therefore, when the truck is moved forwardly beneath the axle casing the casing will be forced upwardly to lift the wheels out of engagement with the floor. The rear end of the automobile will, therefore, be supported in an elevated position and the tires may be inflated or the wheels removed and necessary repair work done. After the repair work has been done or the tires inflated the rear end portion of the truck will be again moved upwardly by means of the handle and as the rear end portion tilts upwardly the truck will move rearwardly and allow the tires to again come into engagement with the ground. It will therefore be seen that this truck will be very easy to operate and will serve not only as means for lifting the rear end of the automobile but also as a means for permitting the rear end portion of the automobile to be moved easily while in the elevated position.

What is claimed is:—

A jack comprising a truck substantially triangular in shape and having a forward cross bar and side bars extending rearwardly therefrom, forward corner blocks having the end portions of the base connected therewith, a corner block secured between the rear ends of the side bars, castors carried by the forward and rear corner blocks, upwardly extending yokes secured to the forward cross bar and side bars and having their upper ends provided with seats for receiving an axle casing, a handle secured to the side bars and extending rearwardly over the rear corner block and at an upward incline, and a brace secured to the rear end portions of the side bars and having upwardly extending arms secured to the handle, the caster of the rear corner block additionally providing means to limit downward movement of the handle under influence of the load; said forward casters providing a support for the weight carried by said yokes, said rear caster affording a limit for downward movement of the handle.

In testimony whereof I hereunto affix my signature.

WALTER W. ARMSTRONG.